US009285960B2

(12) United States Patent
Chmiel et al.

(10) Patent No.: US 9,285,960 B2
(45) Date of Patent: *Mar. 15, 2016

(54) BUSINESS INTELLIGENCE DASHBOARD ASSEMBLY TOOL WITH INDICATIONS OF RELATIONSHIPS AMONG CONTENT ELEMENTS

(75) Inventors: Matthew S. Chmiel, Ottawa (CA);
Jason Hiltz-Laforge, Ottawa (CA);
Alireza Pourshahid, Ottawa (CA);
Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 704 days.

This patent is subject to a terminal disclaimer.

(21) Appl. No.: 13/341,647

(22) Filed: Dec. 30, 2011

(65) Prior Publication Data
US 2013/0174063 A1 Jul. 4, 2013

(51) Int. Cl.
*G06F 3/048* (2013.01)
*G06Q 10/06* (2012.01)
*G06F 3/0484* (2013.01)

(52) U.S. Cl.
CPC .............. *G06F 3/0484* (2013.01); *G06Q 10/06* (2013.01)

(58) Field of Classification Search
CPC ....................................................... G06F 3/048
USPC ........................................................ 715/762
See application file for complete search history.

(56) References Cited

U.S. PATENT DOCUMENTS

| 8,897,310 | B2 | 11/2014 | Kim |
| 2007/0024594 | A1 | 2/2007 | Sakata et al. |
| 2007/0219850 | A1* | 9/2007 | Fischer et al. ................... 705/10 |
| 2009/0271862 | A1 | 10/2009 | Allen et al. |

(Continued)

FOREIGN PATENT DOCUMENTS

| CN | 101009614 A | 8/2007 |
| WO | 2010141601 A2 | 12/2010 |

OTHER PUBLICATIONS

Sakurai et al., "Acquisition of a knowledge dictionary for a text mining system using an inductive learning method," found at http://www.cs.cmu,edu/~mccallum/textbeyond/papers/sakurai.pdf, Aug. 2001, 8 pp.

(Continued)

*Primary Examiner* — Jennifer To
*Assistant Examiner* — Xuyang Xia
(74) *Attorney, Agent, or Firm* — Shumaker & Sieffert, P.A.

(57) ABSTRACT

In one example, a method comprises rendering a dashboard assembly user interface comprising a canvas section and a resource section, the resource section comprising one or more resource content elements, and the canvas section comprising one or more dashboard content elements. The dashboard assembly user interface enables resource content elements to be selectably added to the canvas section as dashboard content elements in response to user inputs, thereby configuring a business intelligence dashboard. The method further comprises searching for relationships between information associated with the one or more resource content elements and information associated with the one or more dashboard content elements; and, for a first resource content element from among the resource content elements that has a relationship with a first dashboard content element from among the dashboard content elements, rendering a visual indication of the relationship between the first resource content element and the first dashboard content element.

20 Claims, 6 Drawing Sheets

FIG. 2

(56) References Cited

U.S. PATENT DOCUMENTS

| | | | |
|---|---|---|---|
| 2010/0235340 A1* | 9/2010 | Todhunter et al. | 707/706 |
| 2011/0179066 A1* | 7/2011 | Cardno et al. | 707/769 |
| 2011/0246925 A1* | 10/2011 | Marchand et al. | 715/772 |
| 2012/0041990 A1* | 2/2012 | Kreindlina et al. | 707/805 |
| 2012/0131217 A1* | 5/2012 | Delorme et al. | 709/230 |

OTHER PUBLICATIONS

Hsu et al., "Applying Multi-Dimensional Scaling Analysis for Finding Similarity Knowledge in OLAP Reports," 2010 Second International Conference on Computer Engineering and Applications, Mar. 19-21, 2010, pp. 269-275.
BI Evaluation Resources page, found at http://www.inetsoft.com/evaluate/, accessed Dec. 7, 2011, 1 p.
Convertigo home page, found at http://www.convertigo.com/, accessed Dec. 7, 2011, 3 pp.
The Cytoscape Test Plan, found at http://wiki.cytoscape.org/CytoscapeTesting, accessed Dec. 7, 2011, 23 pp.
Intellicus, Personalized Dashboards in Minutes, found at http://www.intellicus.com/product/dashboards.htm, May 7, 2010, 1 p.
Data Mining, Wikipedia page, 13 pp., last modified Sep. 29, 2011, 13 pp.
Delta Resources, Inc. home page, found at http://www.deltaresources.com/, accessed Dec. 7, 2011, 1 p.
Dreamface Interactive home page, found at http://dreamface-interactive.com/, accessed Dec. 7, 2011, 2 pp.
Kapow Software home page, found at http://kapowsoftware.com/, accessed Dec. 7, 2011, 1 p.
Quadbase Systems Inc. home page, found at http://www.quadbase.com/edab/dashboard.html, accessed Dec. 7, 2011, 1 p.
Google Code—Google Mashup Editor, found at http://www.quadbase.com/edab/dashboard.html, accessed Dec. 7, 2011, 2 pp.
Visual Paradigm website—Grouping of nodes, found at http://www.visual-paradigm.com/support/documents/vpumluserguide/447/449/20239_groupingofno.html, accessed Dec. 7, 2011, 2 pp.
OpenSocial home page, found at http://docs.opensocial.org/display/OS/Home, accessed Dec. 7, 2011, 4 pp.
IBM Mashup Center, IBM website, found at http://www-01.ibm.com/software/info/mashup-center/, accessed Dec. 7, 2011, 2 pp.
IBM Mashup Center v3.0 Information Center, found at http://publib.boulder.ibm.com/infocenter/mashhelp/v3/index.jsp, accessed Dec. 7, 2011, 1 p.
IBM Mashup Center Wiki, found at http://www-10.lotus.com/ldd/mashupswiki.nsf, accessed Dec. 7, 2011, 3 pp.
Tables of Contents of vols. 1 and 2 from the 2010 Second International Conference on Computer Engineering and Applications, 2010, 20 pp.
idashboard.com, home page, found at www.idashboard.com, accessed Dec. 7, 2011, 1 p.
MashableLogic, found at www.mashablelogic.com, accessed Dec. 7, 2011, 1 p.
Microsoft Popfly, Wikipedia page, last modified Aug. 18, 2011, 3 pp.
Mozilla Labs ubiquity, home page, found at https://mozillalabs.com/ubiquity/, accessed Dec. 7, 2011, 4 pp.
Multidimensional scaling, Wikipedia page, found at http://en.wikipedia.org/wiki/Multidimensional_scaling, last modified Nov. 20, 2011, 5 pp.
Open Mashup Alliance home page, found at http://www.openmashup.org/members/, accessed Dec. 7, 2011, 1 p.
OpenAjax Hub 2.0 and Mashup Assembly Applications, found http://www.openajax.org/whitepapers/OpenAjax%20Hub%202.0%20and%20Mashup%20Assembly%20Applications.php, accessed Dec. 7, 2011, 8 pp.
Pipes™ home page, found at http://pipes.yahoo.com/pipes/, accessed Dec. 7, 2011, 1 p.
Connotate Products page, found at http://www.connotate.com/software.aspx, accessed Dec. 7, 2011, 4 pp.
JackBe® home page, found at www.jackbe.com, accessed Dec. 7, 2011, 2 pp.
Apache Shindig home page, found at http://shindig.apache.org/, accessed Dec. 7, 2011, 1 p.
Synteractive™ home page, found at http://www.synteractive.com/Pages/default.aspx, accessed Dec. 7, 2011, 1 p.
Tableau Software products page: Tableau Desktop, accessed Dec. 7, 2011, 3 pp.
HSU, "Techniques for finding similarity knowledge in OLAP reports," Expert Systems with Applications 38 (2011): 3743-3756.
What is Data Analysis and Data Mining, by Lynn Greiner, found at http://www.dbta.com/Articles/Editorial/Trends-and-Applications/What-is-Data-Analysis-and-Data-Mining-73503.asps, posted Jan. 7, 2011, 7 pp.
VMWareZimbra: About Zimbra, found at http://www.zimbra.com/about/, accessed Dec. 7, 2011, 4 pp.
Amendment in Response to Office Action mailed Jan. 5, 2015, from U.S. Appl. No. 13/886,144, filed Feb. 24, 2015, 13 pp.
Office Action from U.S. Appl. No. 13/886,144, dated Jan. 5, 2015, 28 pp.
Response to Final Office Action dated Jul. 7, 2015, from U.S. Appl. No. 13/886,144, filed Aug. 25, 2015, 10 pp.
Final Office Action from U.S. Appl. No. 13/886,144, dated Jul. 7, 2015, 21 pp.

* cited by examiner

BUSINESS INTELLIGENCE DASHBOARD ASSEMBLY TOOL WITH INDICATIONS OF RELATIONSHIPS AMONG CONTENT ELEMENTS

TECHNICAL FIELD

The invention relates to business intelligence systems, and more particularly, to dashboard environments for business intelligence systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often these complex systems make use of multidimensional data sources that organize and manipulate the tremendous volume of data using data structures referred to as data cubes.

Each data cube, for example, includes a plurality of hierarchical dimensions having levels and members for storing the multidimensional data.

Reporting and analysis end user products (typically referred to as Business Intelligence, or BI, tools) allow users to author reports and perform data exploration and analysis on a myriad of data sources, such as multi-dimensional data structures, relational databases, flat files, Extensible Markup Language ("XML") data, data streams, and unorganized text and data. BI tools may be used to prepare and aggregate individual reports and analyses by executing queries on underlying data sources, and to present those reports and analyses to a user-accessible format such as a BI dashboard environment.

SUMMARY

In general, examples disclosed herein are directed to a business intelligence (BI) dashboard assembly tool.

In one example, a method includes rendering a dashboard assembly user interface comprising a canvas section and a resource section, the resource section comprising one or more resource content elements, and the canvas section comprising one or more dashboard content elements. The dashboard assembly user interface enables resource content elements to be selectably added to the canvas section as dashboard content elements in response to user inputs, thereby configuring a business intelligence dashboard. The method further includes searching for relationships between information associated with the one or more resource content elements and information associated with the one or more dashboard content elements. The method further includes, for a first resource content element from among the resource content elements that has a relationship with a first dashboard content element from among the dashboard content elements, rendering a visual indication of the relationship between the first resource content element and the first dashboard content element.

In another embodiment, a computing system includes one or more processors; one or more computer-readable data storage devices; and an enterprise software application, stored on the one or more computer-readable data storage devices for execution by the one or more processors, and configured for assembling a business intelligence dashboard. The enterprise software application includes program instructions for rendering a dashboard assembly user interface comprising a canvas section and a resource section, the resource section comprising one or more resource content elements, and the canvas section comprising one or more dashboard content elements. The dashboard assembly user interface enables resource content elements to be selectably added to the canvas section as dashboard content elements in response to user inputs, thereby configuring a business intelligence dashboard. The enterprise software application further includes program instructions for searching for relationships between information associated with the one or more resource content elements and information associated with the one or more dashboard content elements. The enterprise software application further includes for a first resource content element from among the resource content elements that has a relationship with a first dashboard content element from among the dashboard content elements, program instructions for rendering a visual indication of the relationship between the first resource content element and the first dashboard content element.

In another embodiment, a computer-readable storage medium includes executable instructions stored on a non-transitory computer-readable storage medium. The executable instructions are configured for causing one or more programmable processors to render a dashboard assembly user interface comprising a canvas section and a resource section, the resource section comprising one or more resource content elements, and the canvas section comprising one or more dashboard content elements, wherein the dashboard assembly user interface enables resource content elements to be selectably added to the canvas section as dashboard content elements in response to user inputs, thereby configuring a business intelligence dashboard. The executable instructions are configured for causing the one or more programmable processors to search for relationships between information associated with the one or more resource content elements and information associated with the one or more dashboard content elements. For a first resource content element from among the resource content elements that has a relationship with a first dashboard content element from among the dashboard content elements, the executable instructions are configured for causing one or more programmable processors to render a visual indication of the relationship between the first resource content element and the first dashboard content element.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
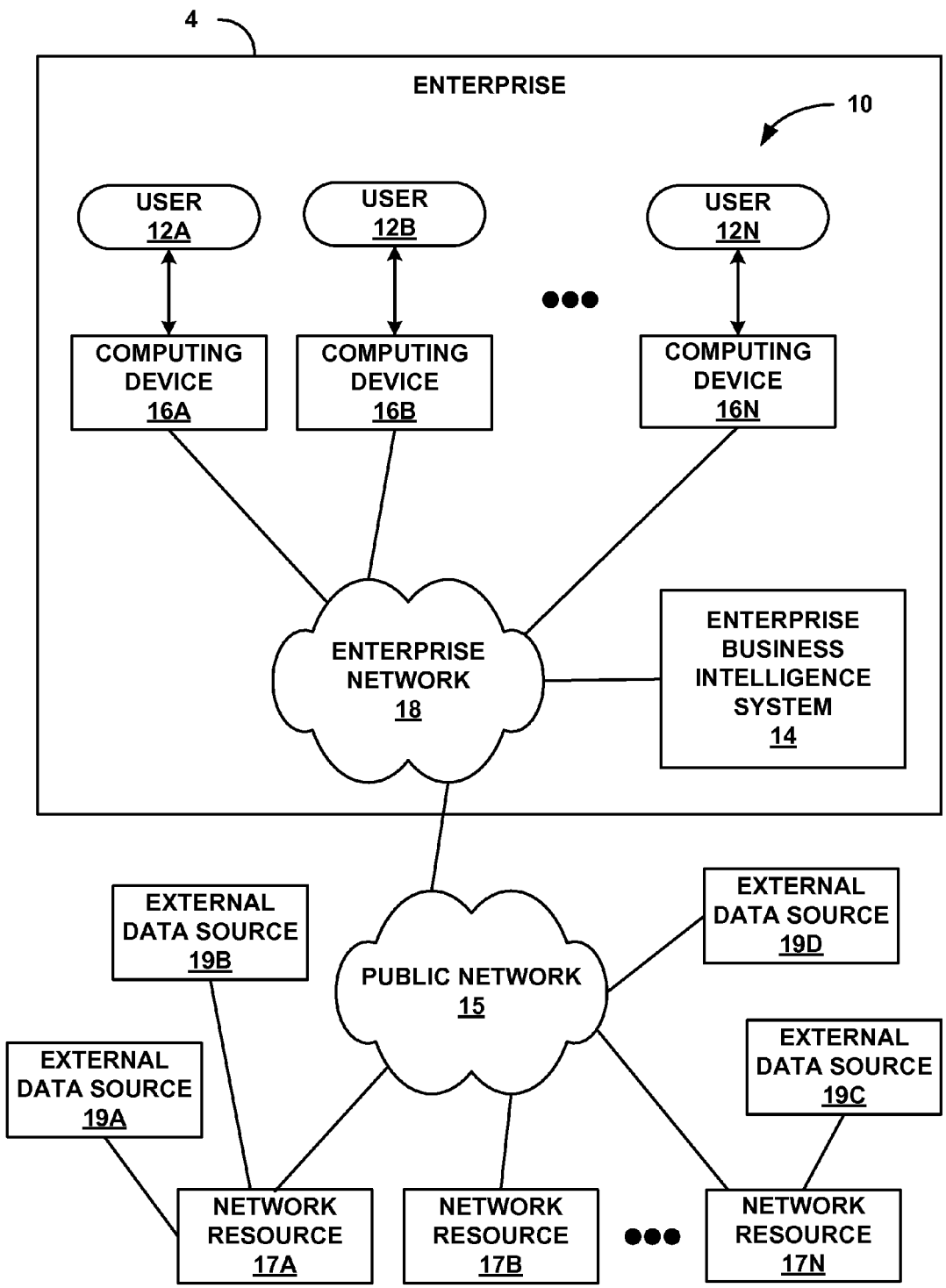
FIG. 1 is a block diagram illustrating an example enterprise having a computing environment in which a plurality of users interacts with an enterprise business intelligence system and data sources accessible over a public network.

FIG. 1 illustrates an example context in which techniques disclosed herein may be used. FIG. 1 is a block diagram illustrating an example enterprise 4 having a computing environment 10 in which a plurality of users 12A-12N (collectively, "users 12") may interact with an enterprise business intelligence system 14. In the system shown in FIG. 1, enterprise business intelligence system 14 is communicatively coupled to a number of computing devices 16A-16N (collectively, "computing devices 16") by an enterprise network 18. Users 12 interact with their respective computing devices to access enterprise business intelligence system 14. Users 12, computing devices 16A-16N, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

Typically, users 12 may use a user-configurable business intelligence (BI) dashboard to view and manipulate data via their respective computing devices 16. This may include data from any of a wide variety of sources, including from multi-dimensional data structures and relational databases within enterprise 4, as well as data from a variety of external sources that may be accessible over public network 15. Multidimensional data structures are "multidimensional" in that each multidimensional data element is defined by a plurality of different object types, where each object is associated with a different dimension. Users 12 may, for example, retrieve data related to store sales by entering a name of a sales person, a store identifier, a date, a product, and a price at which the product was sold, into their respective computing devices 16.

Enterprise users 12 may use a variety of different types of computing devices 16 to run a business intelligence dashboard and to interact with enterprise business intelligence system 14 via enterprise network 18. For example, an enterprise user 12 may run a business intelligence dashboard and interact with enterprise business intelligence system 14 using a laptop computer, desktop computer, or the like, running a web browser, such as Internet Explorer™ from Microsoft Corporation of Redmond, Wash. Alternatively, an enterprise user may use a smartphone or similar device, running a business intelligence dashboard in either a web browser or a dedicated smartphone application for interacting with enterprise business intelligence system 14. In either case, a business dashboard running on a user's computing device 16 may access various data sources from within enterprise business intelligence system 14, as well as any of a variety of external network resources 17A-17N (collectively, "network resources 17") and any of a variety of external data sources 19A-19N (collectively, "external data sources 19") through public network 15.

Enterprise network 18 and public network 15 may represent any communication network, such as a packet-based digital network like a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
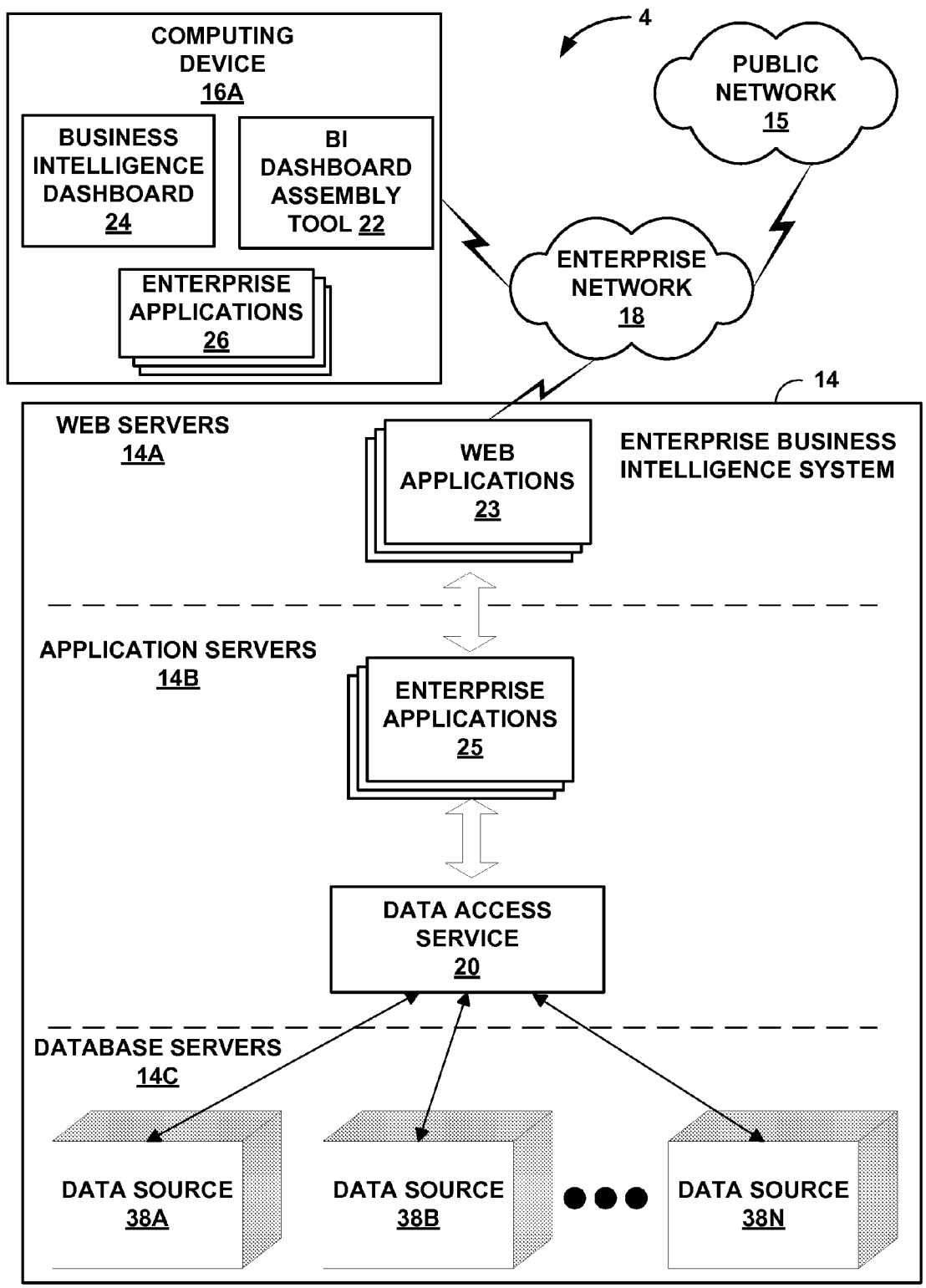
FIG. 2 is a block diagram illustrating one embodiment of an enterprise business intelligence system with a configurable business intelligence dashboard and a business intelligence dashboard assembly tool.

FIG. 2 is a block diagram illustrating in further detail portions of one embodiment of an enterprise business intelligence system 14. In this example implementation, a single client computing device 16A is shown for purposes of example and includes a business intelligence (BI) dashboard 24, a business intelligence (BI) dashboard assembly tool 22 that can be used to create and configure BI dashboard 24, and one or more client-side enterprise software applications 26 that utilize and manipulate multidimensional data. Business intelligence (BI) dashboard assembly tool 22 may be rendered within a general web browser application, within a locally hosted application or mobile application, or other user interface. Business intelligence (BI) dashboard assembly tool 22 may be rendered using any combination of application software and data local to the computing device it's being rendered on, and remotely hosted in one or more application servers or other remote resources.

BI dashboard assembly tool 22 may include separate program elements from BI dashboard 24, program elements that form part of BI dashboard 24, or a combination of the two. BI dashboard assembly tool 22 may be used to assemble content elements onto a dashboard canvas that represents a dashboard under the process of assembly or user-configuration. These content elements may include report elements, e.g., for business intelligence reports generated with enterprise business intelligence system 14, as well as utility widgets or other data elements that may be sourced from external resources through public network 15. These content elements may be referred to as resource content elements when they are generally available as resources but not yet placed in a dashboard or in a canvas section as a dashboard under assembly; they may also be referred to as dashboard content elements once they are placed within a canvas section or a finalized dashboard. Adding a content element to the canvas section may be considered equivalent in some cases to adding it to the dashboard, with the caveat that the canvas section may be further edited or modified before exiting the dashboard assembly mode and finalizing the dashboard (at least for the time being). A content element may be said to be added to the dashboard in that it is added to the canvas section.

FIG. 2 depicts additional detail for enterprise business intelligence system 14 and how it may be used to generate reports that may then be available to BI dashboard assembly tool 22 as resource content elements to potentially add to BI dashboard 24. Any icon, widget, or other user interface element that represents, provides data from, or links to any type of resource, such as a BI report, a software application, a database, a spreadsheet, a data structure, a flat file, Extensible Markup Language ("XML") data, a data stream, unorganized text or data, or other type of file or resource, may be generically referred to as a "resource content element".

As depicted in FIG. 2, enterprise business intelligence system 14 is implemented in accordance with a three-tier architecture: (1) one or more web servers 14A that provide web applications 23 with user interface functions; (2) one or more application servers 14B that provide an operating environment for enterprise software applications 25 and a data access service 20; and (3) database servers 14C that provide one or more data sources 14C. The data sources 14C may include two-dimensional databases and/or multidimensional databases, i.e. cubes. The data sources may be implemented using a variety of vendor platforms, and may be distributed throughout the enterprise. As one example, the data sources 14C may be multidimensional databases configured for Online Analytical Processing (OLAP). As another example, the data sources 14C may be multidimensional databases configured to receive and execute Multidimensional Expression (MDX) queries of some arbitrary level of complexity. As yet another example, the data sources 14C may be two-dimensional relational databases configured to receive and execute SQL queries, also with an arbitrary level of complexity.

The enterprise applications 26 on computing device 16A may issue business queries to enterprise business intelligence system 14 to build reports. Enterprise business intelligence system 14 includes a data access service 20 that provides a logical interface to the data sources 14C. Computing device 16A may transmit query requests through enterprise network 18 to data access service 20. Data access service 20 may, for example, execute on the application servers intermediate to the enterprise applications 25 and the underlying data sources 14C. Data access service 20 retrieves a query result set from the underlying data sources, in accordance with query specifications. Data access service 20 intercepts or receives queries, e.g., by way of an API presented to enterprise applications 25. Data access service 20 may then return this result set to enterprise applications 25, 26 as BI reports that are made available to BI dashboard assembly tool 22 on computing device 16A.

Figure 3:
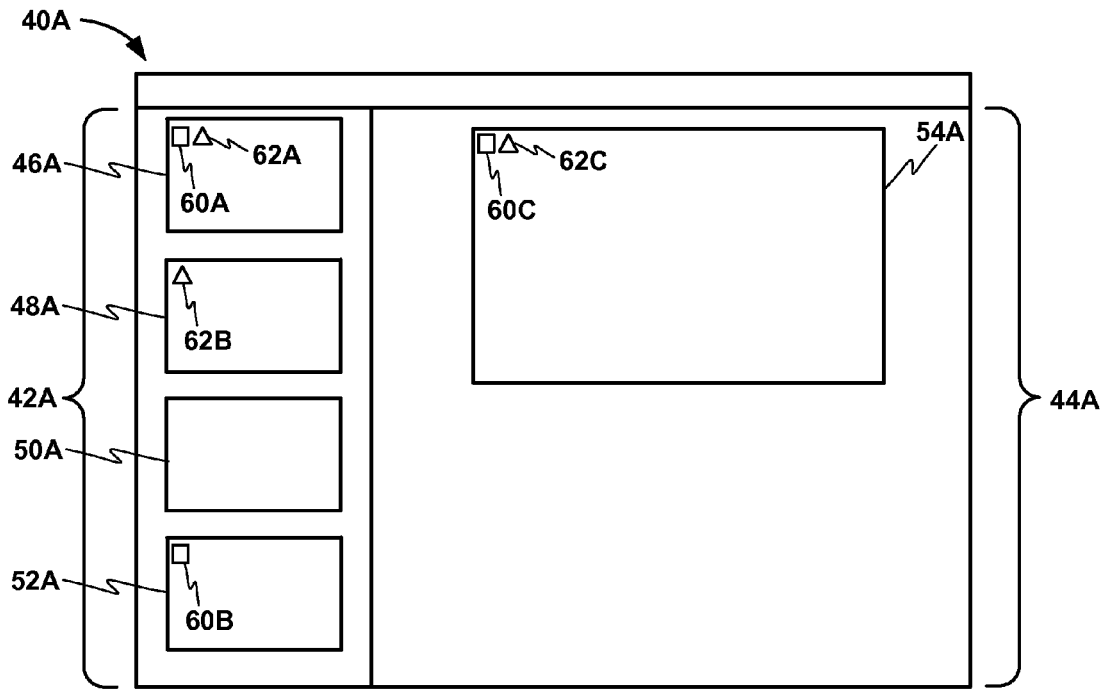
FIG. 3 illustrates an example business intelligence dashboard assembly tool with visual indications of relationships among resource content elements in a resource section and dashboard content elements in a canvas section.

FIG. 3 depicts a dashboard assembly user interface 40A for a BI dashboard assembly tool 22 running on a computing device 16A as depicted in FIGS. 1 and 2, in one example. BI dashboard assembly tool 22, running on a computing device 16A, may render dashboard assembly user interface 40A on a monitor or other display device comprised in or communicatively connected to computing device 16A. Dashboard assembly user interface 40A includes canvas section 44A and resource section 42A. Canvas section 44A serves as a dashboard canvas for assembling or configuring a BI dashboard, while resource section 42A presents resource content elements 46A, 48A, 50A, 52A (i.e. resource content elements 46A-52A) from a variety of different sources as options that may be added to canvas section 44A. While only four specific resource content elements 46A-52A are depicted in FIG. 3, these are merely representative of thousands, millions, or any number of resource content elements representing resources from any of a wide variety of sources that BI dashboard assembly tool 22 may have access to and present within resource section 42A. A user may perform searches of various resources, such as data sources 38 of enterprise BI system 14 and external data sources 19 as depicted in FIGS. 1 and 2, to find potential resources to be presented as resource content elements in resource section 42A.

Various data resources from different sources, such as BI reports or external software applications, may have their own readily available elements or representations, such as icons, widgets, or other user interface elements, that may either simply indicate the identity of the resources or may actively render some form of useful data within the element, that BI dashboard assembly tool 22 may render as resource content elements in resource section 42A. BI dashboard assembly tool 22 may also render a custom resource content element or modify an existing representational element to represent any available resource from any source. BI dashboard assembly tool 22 provides certain modifications to the renderings of resource content elements 46A-52A to provide additional information to the user and to help the user make faster and more informed decisions in selecting resource content elements to add to canvas section 44A, as described in more detail below.

The user may select from among the resource content elements presented in resource section 42A to add to canvas section 44A, thereby making those resource content elements dashboard content elements in canvas section 44A, such as dashboard content element 54A as depicted in FIG. 3, to go into the dashboard once canvas section 44A is finalized. A "dashboard content element" may be any resource content element, as described above, that is added to the canvas section 44A in dashboard assembly user interface 40A and thereby added to a BI dashboard that results from the assembly of the canvas section 44A. The user may also modify or rearrange the dashboard content elements within canvas section 44A. While canvas section 44A is depicted comprising only a single dashboard content element 54A in the view presented in FIG. 3, a user is likely to want to populate canvas section 44A with additional dashboard content elements to increase the usefulness of the resulting BI dashboard.

Once the user is satisfied for the time being at least with the contents of canvas section 44A, the user may finalize or save the content and layout of canvas section 44A as a BI dashboard, for ongoing use as a centralized and convenient interface for understanding and interacting with data from a variety of sources. A user may use BI dashboard assembly tool 22 again and re-open dashboard assembly user interface 40A at any point later to reconfigure the contents and layout of the BI dashboard, as the user sees fit. In another mode of operation, canvas section 44A may be continuously automatically saved or finalized, so that a user may switch at any time from modifying canvas section 44A to using the contents and layout of canvas section 44A as the BI dashboard without having to perform any additional manual action to save or finalize canvas section 44A. Dashboard assembly user interface 40A therefore enables resource content elements 46A-52A to be selectably added to the canvas section 44A as dashboard content elements, like dashboard content element 54A, in response to user inputs, thereby configuring a business intelligence dashboard.

As noted above, BI dashboard assembly tool 22 also provides certain modifications to the renderings of resource content elements 46A-52A to provide additional information to the user, in the form of badges 60A, 60B, 60C, 62A, 62B, and 62C (i.e., badges 60A-62C) as depicted in FIG. 3. BI dashboard assembly tool 22 searches for relationships between information associated with various resource content elements, such as resource content elements 46A-52A, and information associated with the dashboard content elements already included on the canvas section, such as dashboard content element 54A. This information may include data or metadata included in or provided by the resources associated with the respective resource content elements and dashboard content elements, or a variety of other types of information, which are elaborated on below. BI dashboard assembly tool 22 then renders visual indications of the relationships it finds between any one of the resource content elements 46A-52A and the dashboard content element 54A. These visual indications of the relationships may be rendered in the form of "badges" 60A-60C and 62A-62C on various elements in dashboard assembly user interface 40A, including resource content elements 46A, 48A, 50A, 52A and dashboard content element 54A, as depicted in FIG. 3, in an illustrative example.

In particular, badges 60A, 60B, and 60C, represented in FIG. 3 as small square-shaped icons, are visual indications of a relationship that BI dashboard assembly tool 22 has discovered among information associated with resource content element 46A, resource content element 52A, and dashboard content element 54A. This relationship may be, for example, identical or similar elements of data or metadata among the reports, software applications, widgets, or other resources represented by resource content element 46A, resource content element 52A, and dashboard content element 54A. BI dashboard assembly tool 22 may use any of a variety of searching, indexing, or comparing methods to search out these relationships. For example, BI dashboard assembly tool 22 may maintain access to a search index of relevant data, metadata, user access history, and other relevant information related to the dashboard content elements, and may also maintain or build a similar search index for information related to the resource content elements.

BI dashboard assembly tool 22 also discovers another relationship, a relationship among resource content element 46A, resource content element 48A, and dashboard content element 54A. BI dashboard assembly tool 22 provides visual indications of this relationship with badges 62A, 62B, and 62C, represented in FIG. 3 as small triangle-shaped icons in dashboard assembly user interface 40A. In particular, BI dashboard assembly tool 22 renders badge 62A in resource content element 46A, badge 62B in resource content element 48A, and badge 62C in dashboard content element 54A.

With visual indications such as badges 60A-60C and 62A-62C rendered in dashboard assembly user interface 40A, a user is quickly and clearly notified of relationships that various options in resource section 42A have with the content already in the canvas section 44A for assembling the user's dashboard—relationships that the user may find useful in deciding which of resource content elements 46A-52A would make useful additions to the user's dashboard. In particular, BI dashboard assembly tool 22 visually indicates that resource content element 46A has two particular relationships with dashboard content element 54A, and that resource content elements 48A and 52A each have one particular relationships with dashboard content element 54A. BI dashboard assembly tool 22 may also provide additional details, such as in mouse-over metadata or a sidebar menu, about what type of relationship it is or how strong a relationship it is, e.g. how much data or metadata the two elements have in common or the magnitude of some other relevant metric of relationship importance.

BI dashboard assembly tool 22 therefore visually reveals relationship connection points while in dashboard assembly mode. When the dashboard assembly mode is invoked, the BI dashboard assembly tool 22 determines possible relationships in each piece of content on the dashboard and displays visual indications thereof. A user may then perform some simple action to select one or more resource content elements to add to the canvas section 44A, such as by selecting a resource content element and dragging and dropping it into the canvas section 44A, for example. A user may also perform or select additional actions for searching, navigating among, filtering, sorting, or otherwise manipulating resource content elements in resource section 42A or in other interface formats that may potentially be fed into resource section 42A.

While one illustrative example of providing visual indications of relationships among content elements is depicted in FIG. 3, BI dashboard assembly tool 22 may also provide visual indications of relationships among content elements in or proximate to potential resource content elements in any of a variety of folders, tabs, windows, command-line interfaces, or other interface elements that a user may employ to search or navigate for potential resource content elements. For example, in a command-line interface or other form of text interface where graphical elements are not possible, BI dashboard assembly tool 22 may insert particular distinctive text sequences as symbolic visual indications of relationships that resource content elements are found to have with dashboard content elements in dashboard section 44A. A user may repeat any number of times a process of searching for and opening groups or folders or directories of resource content elements in resource section 42A from various sources, then selecting from among resource content elements displayed in resource section 42A to add as new dashboard elements in canvas section 44A. A user may also remove dashboard elements from canvas section 44A or rearrange or modify the dashboard elements in canvas section 44A, for example.

While a small number of badges and resource content elements and only one dashboard content element are depicted in dashboard assembly user interface 40A, a dashboard assembly user interface may accommodate a wide range of numbers of resource content elements, dashboard content elements, and badges or other forms of visual indications of relationships found between resource content elements and dashboard content elements. Additionally, BI dashboard assembly tool 22 may have access to an extremely large number of possible resources, and may display a number of resource content elements at any one time that only represents a small fraction of the total possible resources available. BI dashboard assembly tool 22 may perform further intelligent functions to assist a user in dealing with such a large number of potential options, such as using the relationships it discovers to select, filter, or sort the resource content elements it displays or suggests for display in the resource section of a dashboard assembly user interface, as is described further below.

Figure 4:
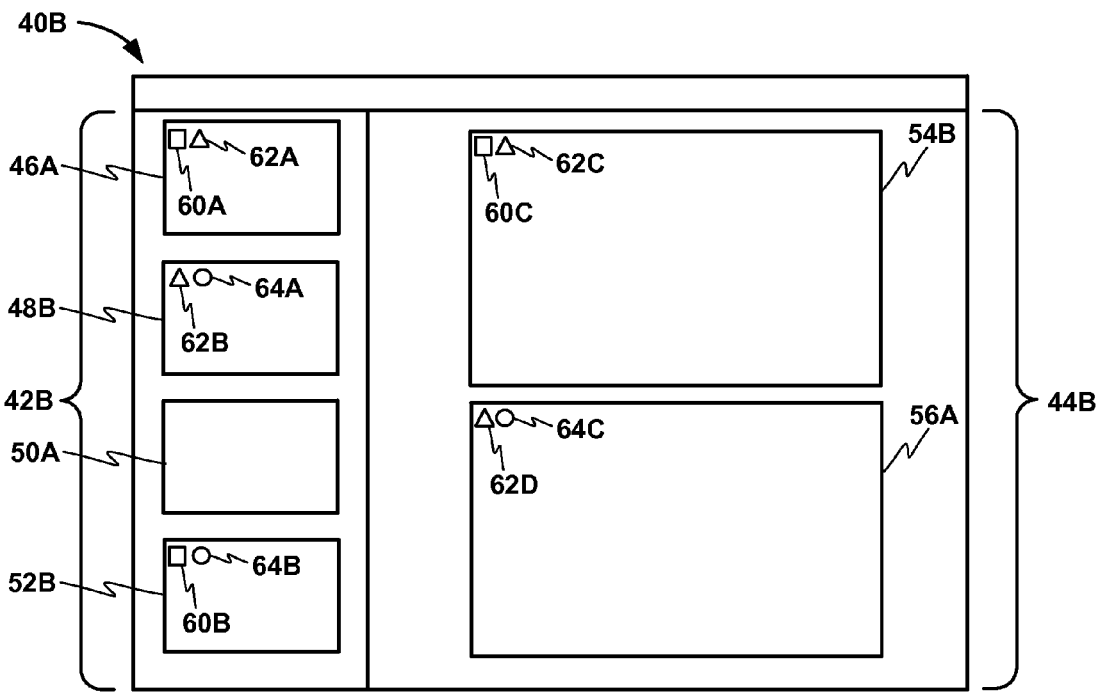
FIG. 4 illustrates another example business intelligence dashboard assembly tool with visual indications of relationships among resource content elements in a resource section and dashboard content elements in a canvas section.

FIG. 4 depicts dashboard assembly user interface 40B as another illustrative example, which is similar to dashboard assembly user interface 40A of FIG. 3 except that additional material now appears in dashboard assembly user interface 40B. In particular, a user has added a second dashboard content element 56A to the canvas section, now labeled canvas section 44B to distinguish it from canvas section 44A as it appears in FIG. 3 without the added material. Resource content elements 46A and 50A and badges 60A, 60B, 60C, 62A, 62B, and 62C also appear in dashboard assembly user interface 40B just as they do in dashboard assembly user interface 40A of FIG. 3. Dashboard assembly user interface 40B also differs from FIG. 3 though in that BI dashboard assembly tool 22 has also searched for relationships between information associated with the resource content elements and the newly added dashboard content element 56A, and added new visual indications of relationships relevant to dashboard content element 56A.

In particular, BI dashboard assembly tool 22 has found that the relationship represented by badges 62A-62C also applies to dashboard content element 56A, and added a badge 62D, in the form of another triangle-shaped icon, to the visual rendering of dashboard content element 56A. Additionally, BI dashboard assembly tool 22 has found a new relationship that exists among some of the resource content elements and the newly added dashboard content element 56A, and added a new badge, in the form of a small circle-shaped icon, to the applicable content elements. This new badge is added as badges 64A and 64B to resource content elements 48B and 52B, respectively, i.e., the same resource content element labeled 48A and 52A in FIG. 3 except with the addition of badges 64A and 64B. A matching badge is also added as a visual indication of this relationship in dashboard content element 56A. While different simple shapes are used for the badges or visual indications in the examples of FIGS. 3 and 4, visual indications may also use different colors, patterns, words, and any type of differentiating designs in various examples.

The dashboard assembly user interface 40B is therefore updated with new information to reflect newly applicable relationships as the user modifies the contents of dashboard assembly user interface 40B. In this way, BI dashboard assembly tool 22 continues to provide updated visual indications of information relevant to what content elements may be useful for the user to add to the dashboard being assembled or reconfigured in canvas section 44B, as well as how the dashboard content elements may be best arranged within canvas section 44B.

BI dashboard assembly tool 22 thereby quickly and automatically provides visual indications of relationships that a user would likely otherwise have to hunt for through a time-consuming manual search or by reviewing and comparing pre-existing dashboards already manually prepared by other users, increasingly impractical in many BI systems given the large amount of resource contents and users' dashboards that may already exist and the likely dissimilarity of other users' dashboards to the needs of any given user. Instead, given the visual indications of relationships among contents such as those shown in FIGS. 3 and 4, a user can rapidly make better decisions as to content the user adds to a dashboard, and more quickly build up a higher quality dashboard, with a ready understanding of the relationships among all the dashboard content elements.

Figure 5:
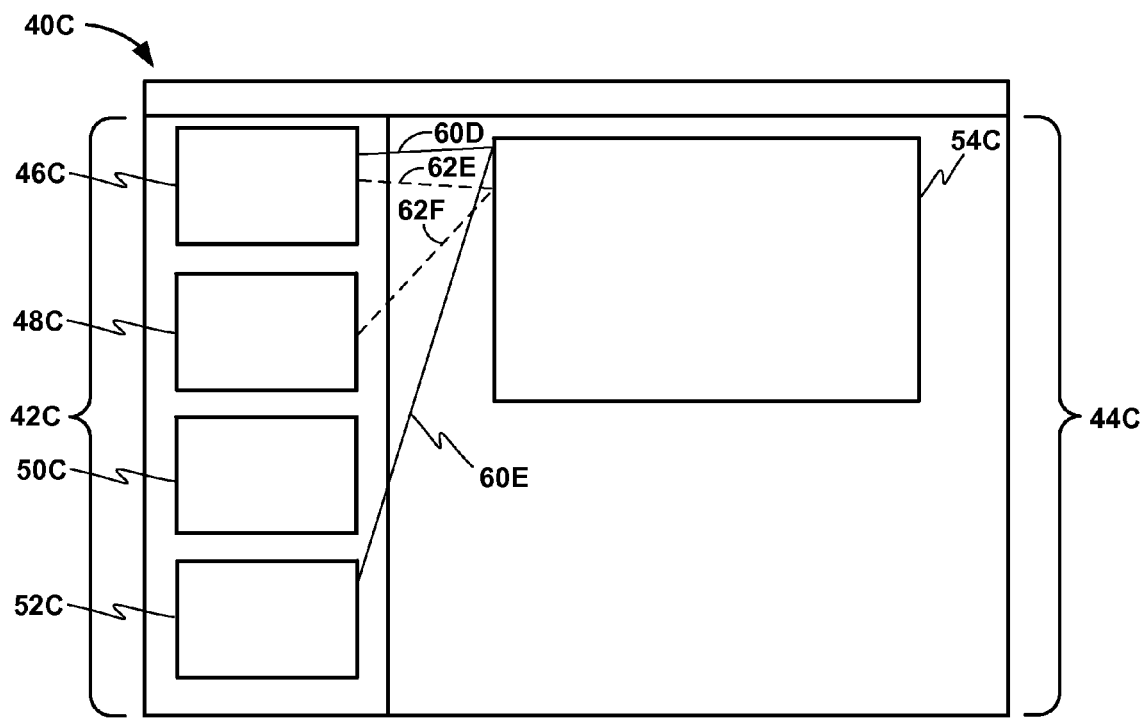
FIG. 5 illustrates another example business intelligence dashboard assembly tool with visual indications of relationships among resource content elements in a resource section and dashboard content elements in a canvas section.
Figure 6:
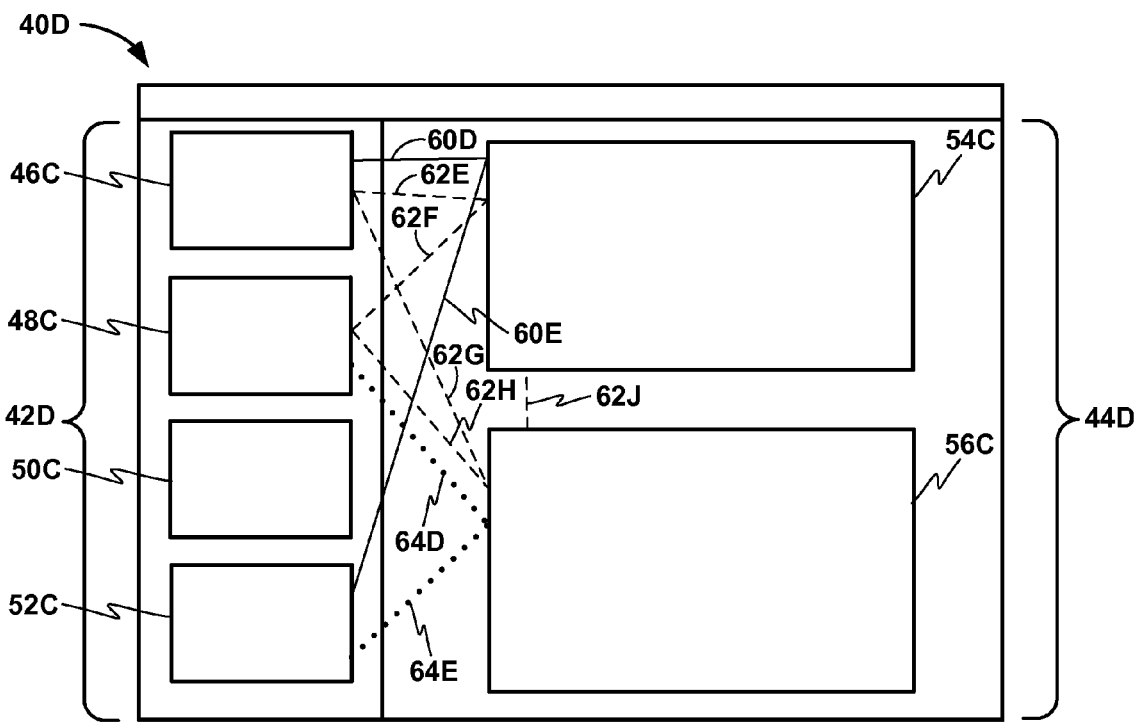
FIG. 6 illustrates another example business intelligence dashboard assembly tool with visual indications of relationships among resource content elements in a resource section and dashboard content elements in a canvas section.

FIGS. 5 and 6 depict a different example of a dashboard assembly user interface that is identical to those depicted in FIGS. 3 and 4 except using connecting lines, instead of badges, as a different form of visual indications of the relationships between information associated with the various resource content elements and dashboard content elements. Specifically, FIG. 5 depicts dashboard assembly user interface 40C that includes canvas section 44C and resource section 42C. Canvas section 44A includes dashboard content element 54C, while resource section 42C presents resource content elements 46C, 48C, 50C, and 52C (i.e. resource content elements 46C-52C) from a variety of different sources as options that may be added to canvas section 44C.

Once BI dashboard assembly tool 22 has searched out and determined the relationships between information associated with the resource content elements and information associated with the dashboard content elements, BI dashboard assembly tool 22 modifies the rendering of dashboard assembly user interface 40C to display connecting lines 60D and 60E of a first color or style connecting resource content elements 46C and 52C, respectively, to dashboard content element 54C; and to display connecting lines 62E and 62F of a second color or style connecting resource content elements 46C and 48C, respectively, to dashboard content element 54C. The visual indications in this case are therefore provided in a form that is proximate to the relevant resource content elements and dashboard content element, and that extends between them, rather than being rendered in or on top of the content elements themselves. The user is thus provided with visual indications of relevant relationships among content elements that assist the user in selecting from among resource content elements 46C-52C to group with dashboard content element 54C in canvas section 44C for building up or reconfiguring a BI dashboard.

Dashboard assembly user interface 40D of FIG. 6 is identical to dashboard assembly user interface 40C of FIG. 5 except for the addition of a new dashboard content element 56C and further connecting lines to serve as visual indications of new relationships. (The resource content elements 46C-52C and dashboard content element 54C are labeled the same in FIG. 6 as in FIG. 5 since the visual indications are displayed proximate to and between the content elements in this example, rather than in or on top of or otherwise modifying the content elements themselves.) With newly added dashboard content element 56C, BI dashboard assembly tool 22 may perform a new search for relationships relevant to this newly added dashboard content, or may already have search results saved for dashboard content element 56C and the available or potentially relevant resource content elements, in different examples.

BI dashboard assembly tool 22 displays new connecting lines 62G and 62H from resource content elements 46C and 48C, respectively, leading to dashboard content element 56C, to serve as visual indications of one relationship between the information that these content elements have in common; and new connecting lines 64D and 64E from resource content elements 48C and 52C, respectively, leading to dashboard content element 56C, to serve as visual indications of a different relationship between the information that these content elements have in common. A connecting line 62J is also displayed between the two dashboard content elements 54C and 56C to serve as a visual indication of the relationship between the information that these have in common, which may be useful to a user in arranging the dashboard content elements on the canvas section. This may be particularly useful for a dashboard that is large and complicated with many dashboard content elements, to provide the user with visual indications useful for grouping dashboard content elements with aspects in common together or otherwise configuring the dashboard content elements in a logical or useful arrangement.

As noted above, BI dashboard assembly tool 22 may use any of a variety of techniques for searching for relationships between information associated with the one or more resource content elements and information associated with the one or more dashboard content elements. For example, this may include searching data and/or metadata in the one or more resource content elements and the one or more dashboard content elements, and analyzing for relationships in the data and/or metadata in the one or more resource content elements and the one or more dashboard content elements.

These relationships in the data or metadata may take any of various forms. For example, analyzing for relationships may include analyzing whether any data comprised in any of the resource content elements is the same as any data comprised in any of the dashboard content elements. This may include, for example, data on the same countries, the same states or provinces, or the same cities or other geographical areas, from across different BI reports, different software applications, different databases, different spreadsheets, different news sources, or other types of resources. This may also include, for example, data on the same years or quarters or other temporal divisions, also across any of various resources.

Analyzing for relationships among the various content elements may also include analyzing whether any data comprised in any one of the resource content elements is complementary data in the same category as any data comprised in any of the dashboard content elements. For example, this may include sales data from two different years, such as 2007 and 2008, such as from different BI reports from the two different years. In this case, the category of data is sales data, and data in this category from different years are complementary.

In another example, analyzing for relationships among the various content elements may also include analyzing whether any data comprised in any one of the resource content elements originates from the same dimension in a model as any data comprised in any of the dashboard content elements, such as with different dimensions in an OLAP data cube. As a particular example, a dashboard content element may include or be associated with data related to units sold, while one or more resource content elements may include or be associated with data related to unit cost, related to the same type of units, where units sold and unit cost are both categories of data that originate from the sales dimension of an OLAP data cube.

Analyzing for relationships among the various content elements may further include analyzing whether various resource and dashboard content elements are used together as dashboard content elements on one or more other users' dashboards, for example. In this case, the number or proportion of other users' dashboards that include those content elements together may also be used as one indicator of strength of the relationship between those content elements. As yet another example, for content elements that take the form of widgets that display updated data within the content element in the dashboard, analyzing for relationships may include analyzing whether any of the widgets are publishers or subscribers to the same events.

The particular nature or strength of any of these relationships may also be indicated in or along with the visual indications, such as the badges or connecting lines, as shown in FIGS. 3-6. That is, some aspect, such as the color or design, of the badges, connecting lines, or other visual indications may include variations that convey information about the nature or strength of these relationships. Information of this sort may also be explicitly asserted with textual captions or summaries, either in or proximate to the visual indications, in mouse-over text or other metadata associated with them, in a sidebar menu, or in another format.

Indicated relationships may or may not result in special behavior when a resource content element is added to the canvas section to be added to the dashboard. For example, an indicated relationship in the data of the content elements, such as two content elements that both show or have associated "country" values, could result in the BI dashboard assembly tool 22 automatically generating a filter control for countries which could be used to filter both content elements on the dashboard. However, in another example, a relationship indicating simply that another user of the system had also added a specific item from the resource section to their dashboard, may not result in any special behavior between the content when added to the canvas section, or added to the dashboard.

In yet another example, a relationship that shows that one widget fires an event and another widget listens to that event may be used so that when both widgets are added to the canvas section to be included together in a dashboard, BI dashboard assembly tool 22 does initiate a special behavior. For example, two content elements added to the dashboard may be an RSS feed viewer and a web page viewer, where the RSS feed viewer may fire an event that the web page viewer listens to, thereby showing the details of a news feed. BI dashboard assembly tool 22 may also use events as another mode for analyzing for relationships among information associated with various content elements, such as by searching events indicated in the resource content elements and the dashboard content elements, and analyzing for relationships among the events indicated in the resource content elements and among the events indicated in the dashboard content elements. This may include events that the content elements or their associated contents initiate or listen to, for example. This may further include analyzing whether any of the resource content elements and any of the dashboard content elements publish to any of the same events or subscribe to any of the same events, for example.

Searching for relationships between information associated with the resource content elements and information associated with the dashboard content elements may also include searching a record of user interactions with the resource content elements and user interactions with the dashboard content elements, and analyzing for relationships between the user interactions with the one or more resource content elements and the user interactions with the one or more dashboard content elements. For example, BI dashboard assembly tool 22 may analyze whether there is a consistent pattern of the user interacting with resources or information associated with a particular resource content element, and interacting with a pre-existing dashboard content element on the user's dashboard, within similar or overlapping periods of time.

As noted above, various resource content elements may be drawn from content elements within an enterprise business intelligence system, and from content elements from external data sources that are external to the enterprise business intelligence system. The content elements from within the enterprise business intelligence system may include, for example, representations of reports generated with a multidimensional business intelligence data access service comprised in the enterprise business intelligence system, while the external data sources may include reports; widgets; software applications; databases; spreadsheets; news feeds; weather reports; stock market tickers, or tickers for other markets such as indexes, bonds, commodities, mutual funds, exchange traded funds (ETFs), real estate investment trusts (REITs), etc.; or any other data source or resource (with the items listed not being mutually exclusive, e.g. a stock market ticker resource may take the form of a widget).

Also as noted above, BI dashboard assembly tool 22 may also provide options for sorting or filtering the resource content elements. For example, BI dashboard assembly tool 22 may enable an option for removing from the resource section any resource content elements found not to have a relationship with any of the dashboard content elements comprised in the canvas section. So, for example, in FIG. 3, with this option enabled, after BI dashboard assembly tool 22 discovers the relationships between the resource content elements 46A, 48A, and 52A with the dashboard content element 54A, as visually indicated with badges 60A-60C and 62A-62C, BI dashboard assembly tool 22 may also remove resource content element 50A from resource section 42A. BI dashboard assembly tool 22 may also take advantage of space thus freed up in the resource section by adding any additional resource content elements that do have one or more relationships with any dashboard content elements in the canvas section.

BI dashboard assembly tool 22 may also enable a user-selectable filter option to filter the resource content elements by one or more selected types of relationships. In response to receiving a user input via the user-selectable filter option, BI dashboard assembly tool 22 may remove any resource content elements found not to have one of the selected types of relationships with any of the dashboard content elements comprised in the canvas section. For example, a user may select to filter only by content elements that have the same type of data, or by content elements that have previously been grouped together in a certain other user's dashboard.

BI dashboard assembly tool 22 may also enable a user-selectable sort option to sort the resource content elements by a number of relationships or a criterion indicating strength of relationships with the dashboard content elements comprised in the canvas section. In response to receiving a user input via the user-selectable sort option, BI dashboard assembly tool 22 may sort the resource content elements in the resource section in accordance with the number of relationships or a criterion indicating strength of relationships with the dashboard content elements comprised in the canvas section, in accordance with the user-selected options. The criterion indicating the strength of the relationships may include the number of data elements in common, or the number of existing dashboards in the enterprise BI system that already have any two content elements included together, as examples.

Figure 7:
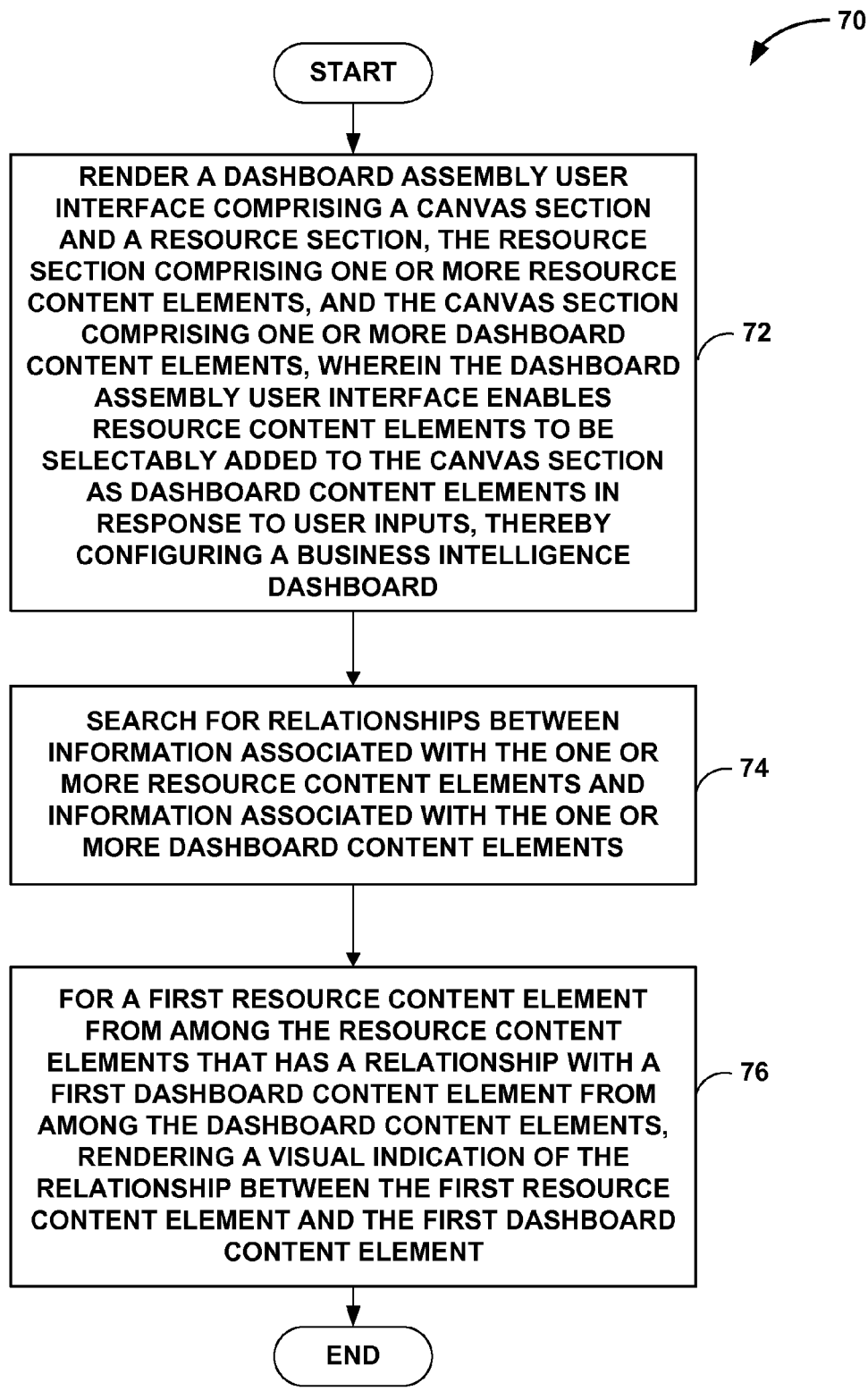
FIG. 7 is a flowchart illustrating example operation of a business intelligence dashboard assembly tool searching for and providing visual indications of relationships among resource content elements in a resource section and dashboard content elements in a canvas section.

FIG. 7 is a flowchart illustrating an example process 70 that may be performed by a BI dashboard assembly tool 22. Although described in reference to enterprise business intelligence system 14 of FIG. 2 and BI dashboard assembly tool 22 as depicted in FIG. 2 and described in connection with FIGS. 2-6, the principles of the invention should not be limited to the described embodiments and may be applied to any system for a BI dashboard assembly tool is capable of searching data sources and facilitating assembly or configuration of a BI dashboard.

As shown in FIG. 7, BI dashboard assembly tool 22 renders a dashboard assembly user interface comprising a canvas section and a resource section, the resource section comprising one or more resource content elements, and the canvas section comprising one or more dashboard content elements, wherein the dashboard assembly user interface enables resource content elements to be selectably added to the canvas section as dashboard content elements in response to user inputs, thereby configuring a business intelligence dashboard (72). BI dashboard assembly tool 22 searches for relationships between information associated with the one or more resource content elements and information associated with the one or more dashboard content elements (74). For a first resource content element from among the resource content elements that has a relationship with a first dashboard content element from among the dashboard content elements, BI dashboard assembly tool 22 renders a visual indication of the relationship between the first resource content element and the first dashboard content element (76). BI dashboard assembly tool 22 may further render visual relationships between any pairs of resource content elements and dashboard content elements as appropriate to provide useful information on these relationships in a dashboard assembly user interface.

The techniques described herein make reference to business intelligence reports generated with the MDX query language and the SQL query language, as illustrative examples of a multidimensional data query language and a relational database query language, respectively. However, the techniques described herein may be applied to reports generated with any other structured language or tool capable of querying any type of data structures, or with any type of query result set or any other type of data.

Figure 8:
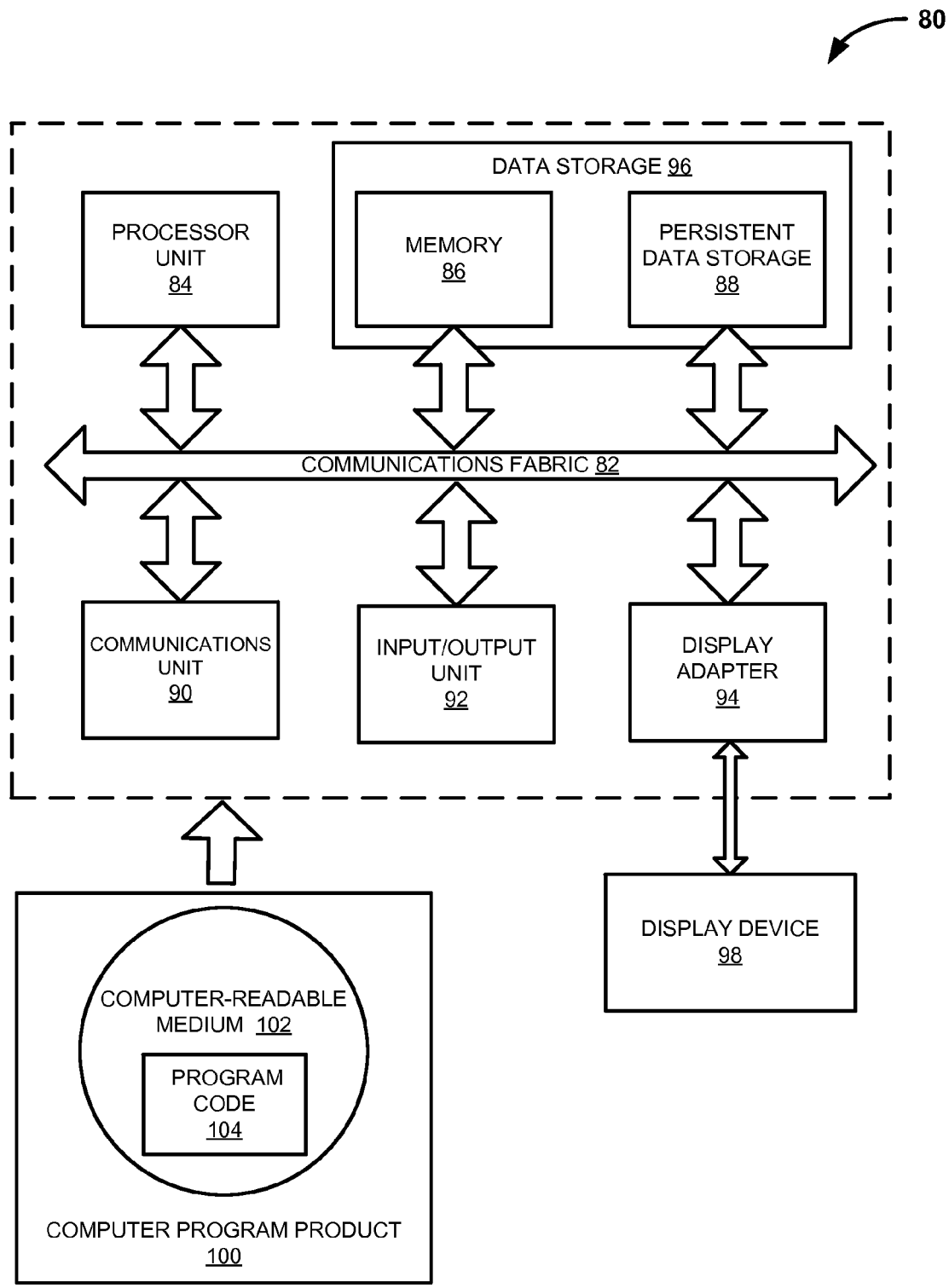
FIG. 8 is a block diagram of a computing device that may run a business intelligence dashboard assembly tool.

FIG. 8 is a block diagram of a computing device 80 that may be used to run a BI dashboard assembly tool, according to an illustrative example. Computing device 80 may be a workstation, server, mainframe computer, notebook or laptop computer, desktop computer, tablet, smartphone, feature phone, or other programmable data processing apparatus of any kind. Other possibilities for computing device 80 are possible, including a computer having capabilities or formats other than or beyond those described herein.

In this illustrative example, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, but those skilled in the art will recognize that this also constitutes an example of a physical, tangible, non-transitory computer-readable data storage device. Executable instructions are stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a BI dashboard assembly tool that may search for and render visual indications of relationships among resource content elements and dashboard content elements, to assist a user in assembling or configuring a BI dashboard, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, a mobile device operating system such as iOS® from Apple® Inc., or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

As will be appreciated by one skilled in the art, aspects of the present invention may be embodied as a method, a device, a system, or a computer program product, for example. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. A non-exhaustive list of additional specific examples of a computer readable storage medium includes the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wireline, optical fiber cable, etc., or any suitable combination of the foregoing. Computer program code for carrying out operations for aspects of the present invention may be written in any combination of one or more programming languages, including an object oriented programming language such as Java, Smalltalk, C++, Objective-C, or the like, or other imperative programming languages such as C, or functional languages such as Common Lisp, Haskell, or Clojure, or multi-paradigm languages such as C#, Python, Ruby, or Scala, among a variety of illustrative examples. One or more sets of applicable program code may execute partly or entirely on the user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures. A graphical user interface may be executed on a client computing device and may access applications from the one or more web server applications, for example. Various content within a browser or dedicated application graphical user interface may be rendered or executed in or in association with the web browser using any combination of any release version of HTML, CSS, JavaScript, XML, AJAX, JSON, and various other languages or technologies. Other content may be provided by computer programs, software applications, modules, or other elements executed on the one or more web servers and written in any programming language and/or using or accessing any computer programs, software elements, data structures, or technologies, in various illustrative embodiments.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, may create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer implemented process such that the instructions which execute on the computer or other programmable apparatus provide or embody processes for implementing the functions or acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may be executed in a different order, or the functions in different blocks may be processed in different but parallel threads, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The description of the present disclosure has been presented for purposes of illustration and description, and is not intended to be exhaustive or limited to the disclosure in the form disclosed. Many modifications and variations will be understood by those of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

What is claimed is:

1. A computing system comprising:
   one or more processors;
   one or more computer-readable data storage devices; and
   an enterprise software application, stored on the one or more computer-readable data storage devices for execution by the one or more processors, and configured for assembling a business intelligence dashboard, wherein the enterprise software application comprises:
   program instructions for rendering a dashboard assembly user interface comprising a canvas section and a resource section, the resource section comprising one or more resource content elements, and the canvas section comprising one or more dashboard content elements, wherein the dashboard assembly user interface enables resource content elements to be selectably added to the canvas section as dashboard content elements in response to user inputs, thereby configuring a business intelligence dashboard;
   program instructions for searching for one or more relationships between information associated with the one or more resource content elements and information associated with the one or more dashboard content elements, wherein searching for the one or more relationships comprises analyzing whether any data comprised in the one or more resource content elements is at least one of (i) the same as, (ii) complementary to and in the same category as, or (iii) originating from a same dimension in a model as, any data comprised in the one or more dashboard content elements; and
   for a first resource content element from among the one or more resource content elements that has a relationship of the one or more relationships with a first dashboard content element from among the one or more dashboard content elements, program instructions for rendering a visual indication of the relationship between the first resource content element and the first dashboard content element, wherein the visual indication of the relationship indicates at least a strength of the relationship between the first resource content element and the first dashboard content element.

2. The computing system of claim 1, wherein the business intelligence dashboard is a first business intelligence dashboard within an enterprise business intelligence system, and wherein the program instructions for searching for the one or more relationships between the information associated with the one or more resource content elements and the information associated with the one or more dashboard content elements comprise:

program instructions for analyzing whether any of the resource content elements and any of the dashboard content elements are both used as dashboard content elements on a second business intelligence dashboard within the enterprise business intelligence system.

3. The computing system of claim 1, wherein the program instructions for searching for the one or more relationships between the information associated with the one or more resource content elements and the information associated with the one or more dashboard content elements comprise:
   program instructions for searching events indicated in the one or more resource content elements and in the one or more dashboard content elements; and
   program instructions for analyzing for the one or more relationships among the events indicated in the one or more resource content elements and among the events indicated in the one or more dashboard content elements.

4. The computing system of claim 3, wherein the program instructions for analyzing for the one or more relationships among the events indicated in the one or more resource content elements and among the events indicated in the one or more dashboard content elements comprise:
   program instructions for analyzing whether any of the resource content elements and any of the dashboard content elements publish to any of the same events or subscribe to any of the same events.

5. The computing system of claim 1, wherein the program instructions for searching for the one or more relationships between information associated with the one or more resource content elements and information associated with the one or more dashboard content elements comprise:
   program instructions for searching a record of user interactions with the one or more resource content elements and user interactions with the one or more dashboard content elements; and
   program instructions for analyzing for the one or more relationships between the user interactions with the one or more resource content elements and the user interactions with the one or more dashboard content elements.

6. The computing system of claim 1, wherein the program instructions for rendering the visual indication of the relationship between the first resource content element and the first dashboard content element comprise:
   program instructions for rendering the visual indication of the relationship in or proximate to the dashboard assembly user interface.

7. The computing system of claim 1, wherein the program instructions for rendering the visual indication of the relationship between the first resource content element and the first dashboard content element comprise:
   program instructions for rendering a visual element that connects the first resource content element and the first dashboard content element.

8. The computing system of claim 1, wherein the one or more resource content elements comprise one or more content elements from within an enterprise business intelligence system, and one or more content elements from an external data source that is external to the enterprise business intelligence system.

9. The computing system of claim 1, wherein the enterprise software application further comprises:
   program instructions for enabling a user-selectable filter option to filter the resource content elements by one or more selected types of relationships, and, in response to receiving a user input via the user-selectable filter option, removing any resource content elements found not to have one of the selected types of relationships with any of the dashboard content elements comprised in the canvas section.

10. The computing system of claim 1, wherein the enterprise software application further comprises:
    program instructions for enabling a user-selectable sort option to sort the resource content elements by a number of relationships or a criterion indicating strength of relationships with the dashboard content elements comprised in the canvas section, and, in response to receiving a user input via the user-selectable sort option, sort resource content elements in the resource section in accordance with the number of relationships or the criterion indicating strength of relationships with the dashboard content elements comprised in the canvas section.

11. A computer program product comprising executable instructions stored on a non-transitory computer-readable storage medium, configured for causing one or more programmable processors to:
    render a dashboard assembly user interface comprising a canvas section and a resource section, the resource section comprising one or more resource content elements, and the canvas section comprising one or more dashboard content elements, wherein the dashboard assembly user interface enables resource content elements to be selectably added to the canvas section as dashboard content elements in response to user inputs, thereby configuring a business intelligence dashboard;
    search for one or more relationships between information associated with the one or more resource content elements and information associated with the one or more dashboard content elements, wherein searching for the one or more relationships comprises analyzing whether any data comprised in the one or more resource content elements is at least one of (i) the same as, (ii) complementary to and in the same category as, or (iii) originating from a same dimension in a model as, any data comprised in the one or more dashboard content elements; and
    for a first resource content element from among the one or more resource content elements that has a relationship of the one or more relationships with a first dashboard content element from among the one or more dashboard content elements, render a visual indication of the relationship between the first resource content element and the first dashboard content element, wherein the visual indication of the relationship indicates at least a strength of the relationship between the first resource content element and the first dashboard content element.

12. The computer program product of claim 11, wherein the business intelligence dashboard is a first business intelligence dashboard within an enterprise business intelligence system, and wherein the executable instructions configured for causing one or more programmable processors to search for the one or more relationships between the information associated with the one or more resource content elements and the information associated with the one or more dashboard content elements comprise:
    executable instructions configured for causing the one or more programmable processors to analyze whether any of the resource content elements and any of the dashboard content elements are both used as dashboard content elements on a second business intelligence dashboard within the enterprise business intelligence system.

13. The computer program product of claim 11, wherein the executable instructions configured for causing one or more programmable processors to search for relationships between information associated with the one or more resource content elements and information associated with the one or more dashboard content elements comprise:

executable instructions configured for causing the one or more programmable processors to search events indicated in the one or more resource content elements and in the one or more dashboard content elements, and executable instructions configured for causing the one or more programmable processors to analyze for relationships among the events indicated in the one or more resource content elements and among the events indicated in the one or more dashboard content elements.

14. The computer program product of claim 13, wherein the executable instructions configured for causing one or more programmable processors to analyze for relationships among the events indicated in the one or more resource content elements and among the events indicated in the one or more dashboard content elements comprise:

executable instructions configured for causing the one or more programmable processors to analyze whether any of the resource content elements and any of the dashboard content elements publish to any of the same events or subscribe to any of the same events.

15. The computer program product of claim 11, wherein the executable instructions configured for causing one or more programmable processors to search for relationships between information associated with the one or more resource content elements and information associated with the one or more dashboard content elements comprise:

executable instructions configured for causing the one or more programmable processors to search a record of user interactions with the one or more resource content elements and user interactions with the one or more dashboard content elements, and executable instructions configured for causing the one or more programmable processors to analyze for relationships between the user interactions with the one or more resource content elements and the user interactions with the one or more dashboard content elements.

16. The computer program product of claim 11, wherein the executable instructions configured for causing one or more programmable processors to render the visual indication of the relationship between the first resource content element and the first dashboard content element comprise:

executable instructions configured for causing the one or more programmable processors to render the visual indication of the relationship in or proximate to the dashboard assembly user interface.

17. The computer program product of claim 11, wherein the executable instructions configured for causing one or more programmable processors to render the visual indication of the relationship between the first resource content element and the first dashboard content element comprise:

executable instructions configured for causing the one or more programmable processors to render a visual element that connects the first resource content element and the first dashboard content element.

18. The computer program product of claim 11, wherein the one or more resource content elements comprise one or more content elements from within an enterprise business intelligence system, and one or more content elements from an external data source that is external to the enterprise business intelligence system.

19. The computer program product of claim 11, further comprising executable instructions configured for causing the one or more programmable processors to enable a user-selectable filter option to filter the resource content elements by one or more selected types of relationships, and, in response to receiving a user input via the user-selectable filter option, removing any resource content elements found not to have one of the selected types of relationships with any of the dashboard content elements comprised in the canvas section.

20. The computer program product of claim 11, further comprising executable instructions configured for causing the one or more programmable processors to enable a user-selectable sort option to sort the resource content elements by a number of relationships or a criterion indicating strength of relationships with the dashboard content elements comprised in the canvas section, and, in response to receiving a user input via the user-selectable sort option, sort resource content elements in the resource section in accordance with the number of relationships or the criterion indicating strength of relationships with the dashboard content elements comprised in the canvas section.

\* \* \* \* \*